US012589854B2

(12) United States Patent
Brewer, Jr. et al.

(10) Patent No.: US 12,589,854 B2
(45) Date of Patent: Mar. 31, 2026

(54) ANTI-CRIPPLING ELEMENT STIFFENER AND ASSOCIATED METHODS

(71) Applicant: NWI NASHVILLE, LLC, Nashville, TN (US)

(72) Inventors: Harold M. Brewer, Jr., Goodlettsville, TN (US); Steve McDonough, Burns, TN (US); Travis Simmons, Lebanon, TN (US)

(73) Assignee: NWI NASHVILLE, LLC, Nashville, TN (US)

( * ) Notice: Subject to any disclaimer, the term of this patent is extended or adjusted under 35 U.S.C. 154(b) by 33 days.

(21) Appl. No.: 18/534,058

(22) Filed: Dec. 8, 2023

(65) Prior Publication Data

US 2025/0171131 A1 May 29, 2025

Related U.S. Application Data

(60) Provisional application No. 63/603,466, filed on Nov. 28, 2023.

(51) Int. Cl.
B64C 3/18 (2006.01)
B64C 1/12 (2006.01)

(52) U.S. Cl.
CPC ................. B64C 1/12 (2013.01); B64C 3/187 (2013.01); B23P 2700/01 (2013.01); B64C 3/182 (2013.01); Y10T 29/49622 (2015.01)

(58) Field of Classification Search
CPC ......... Y10T 29/49618; Y10T 29/49622; Y10T 29/49863; B23P 2700/01; B64C 3/187
See application file for complete search history.

(56) References Cited

U.S. PATENT DOCUMENTS

| | | | | | |
|---|---|---|---|---|---|
| 2,039,398 | A | * | 5/1936 | Dye | B27M 3/004 |
| | | | | | 52/847 |
| 2,314,319 | A | * | 3/1943 | Smith | B23P 19/10 |
| | | | | | 269/106 |
| 2,648,895 | A | * | 8/1953 | Davis | F16F 1/02 |
| | | | | | 267/165 |
| 3,678,558 | A | * | 7/1972 | Fredericks | B31D 3/02 |
| | | | | | 228/173.6 |

(Continued)

FOREIGN PATENT DOCUMENTS

| | | | |
|---|---|---|---|
| CN | 103195184 | B | 6/2015 |
| CN | 207523915 | U * | 6/2018 |

(Continued)

*Primary Examiner* — Jermie E Cozart
(74) *Attorney, Agent, or Firm* — Clark Hill PLC; James R. Foley

(57) ABSTRACT

A method of stiffening the integral ribs of a panel to prevent crippling of the ribs during forming of the panel. The method provides that anti-crippling stiffeners are attached to the ribs, such as by using clamps. Then, the panel is formed while the anti-crippling stiffeners are attached to the ribs. The anti-crippling stiffeners add stiffness to the ribs and prevent the ribs from crippling during forming of the panel. The anti-crippling stiffeners could be C-shaped and be attached to the panel using C-shaped clamps. Both the panel and the anti-crippling stiffeners could be formed of aluminum. Another embodiment involves clamping at least one anti-crippling strap to the flange of a wing stringer to prevent the flange from crippling during forming of the wing stringer.

58 Claims, 14 Drawing Sheets

(56) References Cited

U.S. PATENT DOCUMENTS

| | | | | |
|---|---|---|---|---|
| 5,893,534 A * | 4/1999 | Watanabe | B64C 1/064 | 244/119 |
| 6,539,769 B1 * | 4/2003 | McDaniel | B21D 1/14 | 72/705 |
| 8,043,027 B2 | 10/2011 | Duroch et al. | | |
| 8,715,352 B2 | 5/2014 | Lopez et al. | | |
| 8,869,468 B2 | 10/2014 | Hinchman | | |
| 8,961,533 B2 | 2/2015 | Stahler et al. | | |
| 9,909,335 B2 | 3/2018 | Powell et al. | | |
| 10,280,642 B2 | 5/2019 | Zhao et al. | | |
| 11,547,403 B2 | 1/2023 | Shelton, IV et al. | | |

FOREIGN PATENT DOCUMENTS

| | | | | |
|---|---|---|---|---|
| CN | 106499077 B | 10/2018 | | |
| CN | 111781060 A | 10/2020 | | |
| CN | 211740896 U | 10/2020 | | |
| JP | 4901491 B2 | 1/2012 | | |
| WO | WO-2010136630 A2 * | 12/2010 | | B29C 73/04 |
| WO | 2022037530 A1 | 2/2022 | | |

* cited by examiner

10

10

"L" or
angle

"C" or
channel

"Z"

T or
blade

T

J

"Half" or
omega

ANTI-CRIPPLING ELEMENT STIFFENER AND ASSOCIATED METHODS

RELATED APPLICATION (PRIORITY CLAIM)

This application claims the benefit of U.S. Provisional Application Ser. No. 63/603,466, filed Nov. 28, 2023, which is hereby incorporated herein by reference in its entirety.

BACKGROUND

The present invention generally relates to stiffening structures for use with thin structures to prevent crippling, and more specifically relates to discrete anti-crippling stiffeners that are disposed behind thin structures to prevent crippling during forming of a panel.

Highly optimized, integrally machined, monolithic panel and stiffener structures are used throughout aircraft and rocket applications. The integrally machined stiffening systems offer high strength to weight ratios and require no fasteners to attach the stiffeners to the underlying panel that forms the outer skin of the vehicle. These types of structures are found in wing skins, fuselages, and fairings of aircraft and the fuel tanks, shrouds, and payload fairings of rockets. The same machined features that yield high strength to weight ratios and eliminate fasteners are often delicate and easily damaged during forming operations, which severely limits the extent to which design optimization can be performed. Designers would like to tailor the stiffening systems to be stronger in areas where higher loads are encountered and lighter in areas where only aerodynamic loads are present, but this creates a stiffness imbalance in the structure that can lead to damage during forming.

Panels that are found on fuel tanks, payload fairings, shrouds and the like often have a repeating network of ribs machined into them to give them strength without having fasteners protruding through the outer skin. For example, FIGS. 1A, 1B and 1C, collectively, illustrate three basic types of grid-stiffened panels, wherein FIG. 1A illustrates an Orthogrid, FIG. 1B illustrates an Isogrid, and FIG. 1C illustrates an Anglegrid.

FIG. 2 shows a panel 10 that includes some thick ribs 12 and some thin ribs 14. The reason that the panel has both thick and thin ribs is because typically designers want to vary the thickness of the ribs, so that they are thicker where more loads are encountered and thinner in lightly loaded areas to save weight. However, the fact that the panel has ribs of varying thickness causes a stiffness imbalance that can lead to rib damage during forming.

As shown in FIG. 3, the difference in stiffening between the thin and thick ribs causes the thinner ribs to buckle and cripple during forming (in FIG. 3 the crippling is represented with lines 16). Unfortunately, crippling can occur in both horizontal and vertical ribs during forming. Preventing this type of crippling during forming has been elusive.

SUMMARY

An object of an embodiment of the present invention is to provide a method of strengthening a portion of a part before forming the part so that the portion does not cripple during forming.

Briefly, an embodiment of the present invention provides a method of stiffening the integral ribs of a panel in order to prevent crippling of the ribs during forming of the panel. The method provides that anti-crippling stiffeners are attached to the ribs, such as by using clamps. Then, the panel is formed while the anti-crippling stiffeners are attached to the ribs. The anti-crippling stiffeners add stiffness to the ribs and prevent the ribs from crippling during forming of the panel. The anti-crippling stiffeners could be C-shaped and be attached to the panel using C-shaped clamps. Both the panel and the anti-crippling stiffeners could be formed of aluminum.

In another embodiment of the present invention, two anti-crippling straps are clamped or otherwise attached to the flange of a wing stringer to prevent the flange from crippling during forming of the wing stringer.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIGS. 1A, 1B and 1C, collectively, illustrate three basic types of grid-stiffened panels, wherein FIG. 1A illustrates an Orthogrid, FIG. 1B illustrates an Isogrid, and FIG. 1C illustrates an Anglegrid;

DESCRIPTION OF ILLUSTRATED EMBODIMENTS

Figures 1A, 1B, 1C:
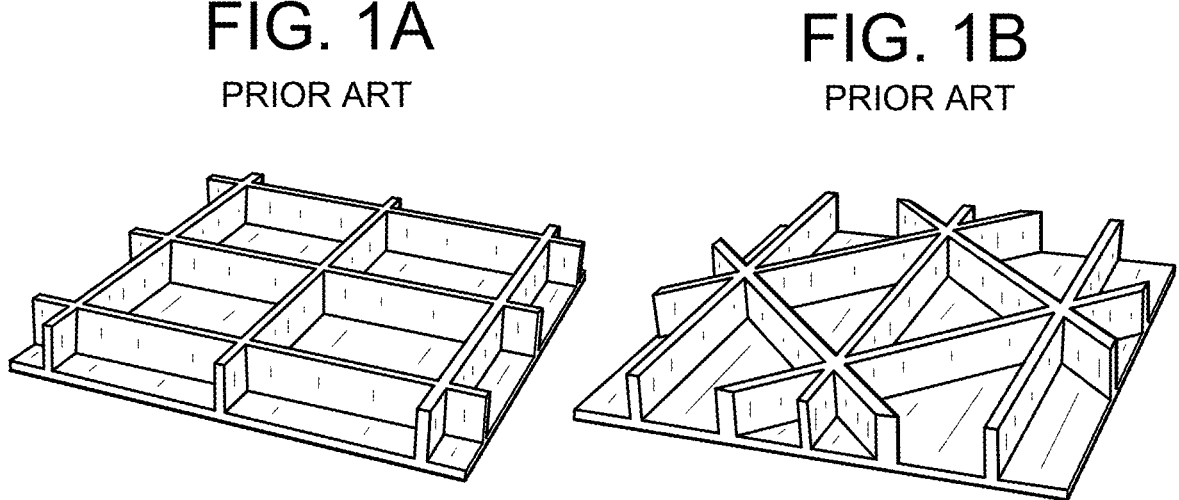
Figure 2:
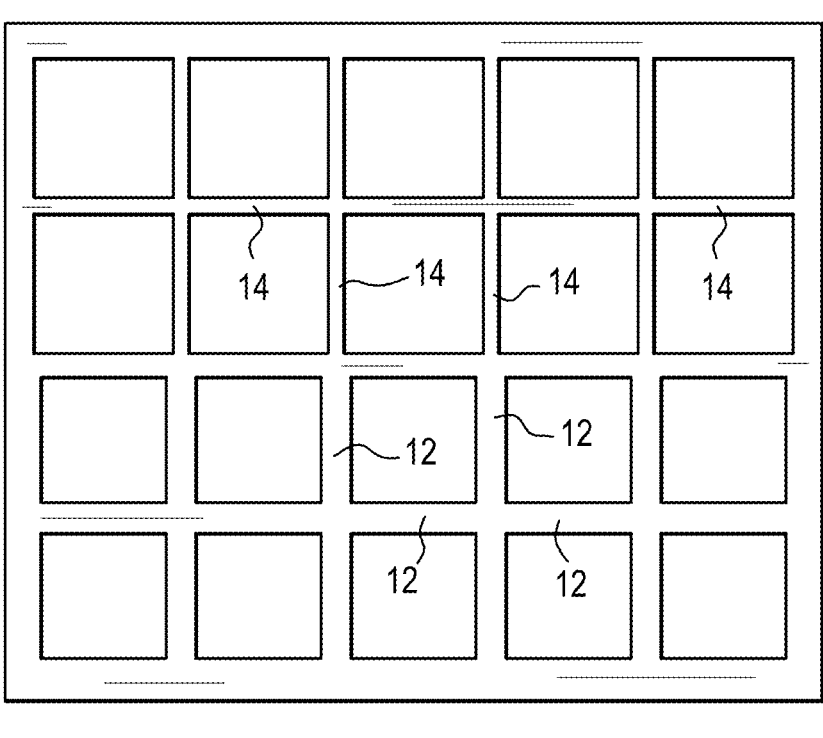
FIG. 2 illustrates a grid-stiffened panel which includes both thinner ribs and thicker ribs, wherein thicker ribs are provided where more loads are encountered, and thinner ribs are provided in lightly loaded areas to save weight.
Figure 3:
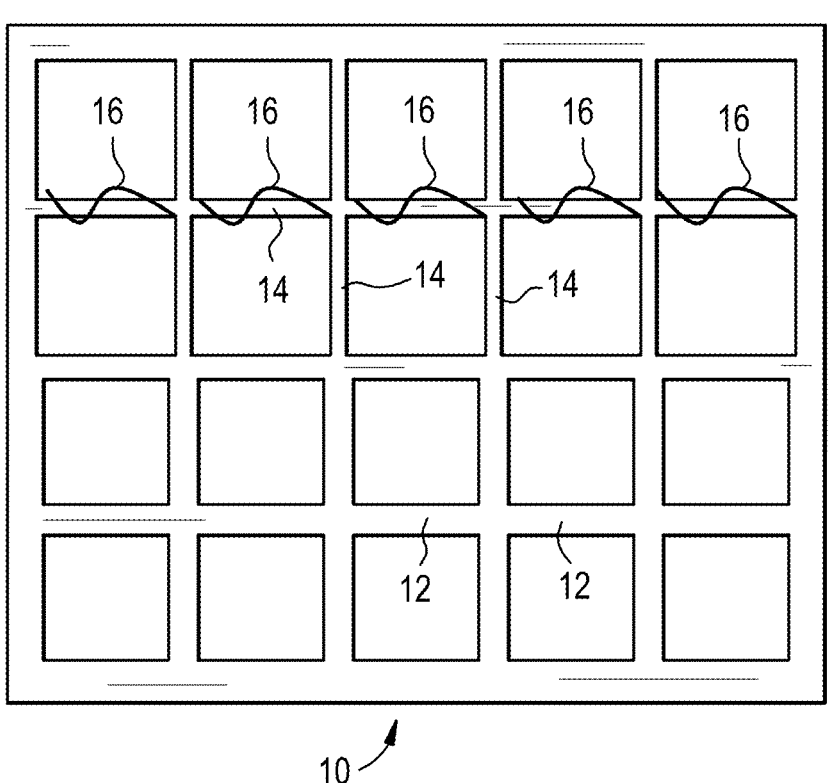
FIG. 3 illustrates the difference in stiffening between the thin and thick ribs and how this difference causes the thinner ribs to buckle and cripple during forming.

While this invention may be susceptible to embodiment in different forms, there are shown in the drawings and will be described herein in detail, specific embodiments with the understanding that the present disclosure is to be considered an exemplification of the principles of the invention and is not intended to limit the invention to that as illustrated.

Figure 4A:
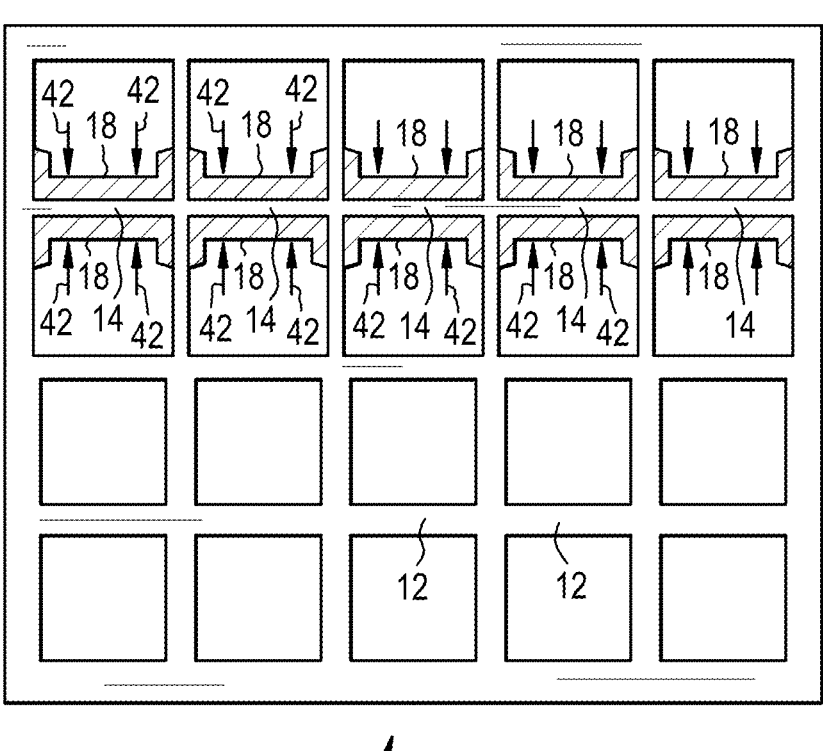
FIGS. 4A and 4B illustrate embodiments of the present invention, wherein anti-crippling stiffeners are attached to integrated thin ribs of a panel in order to effectively make them stiffer and able to be formed without damaging them (i.e., without crippling)
Figure 4B:
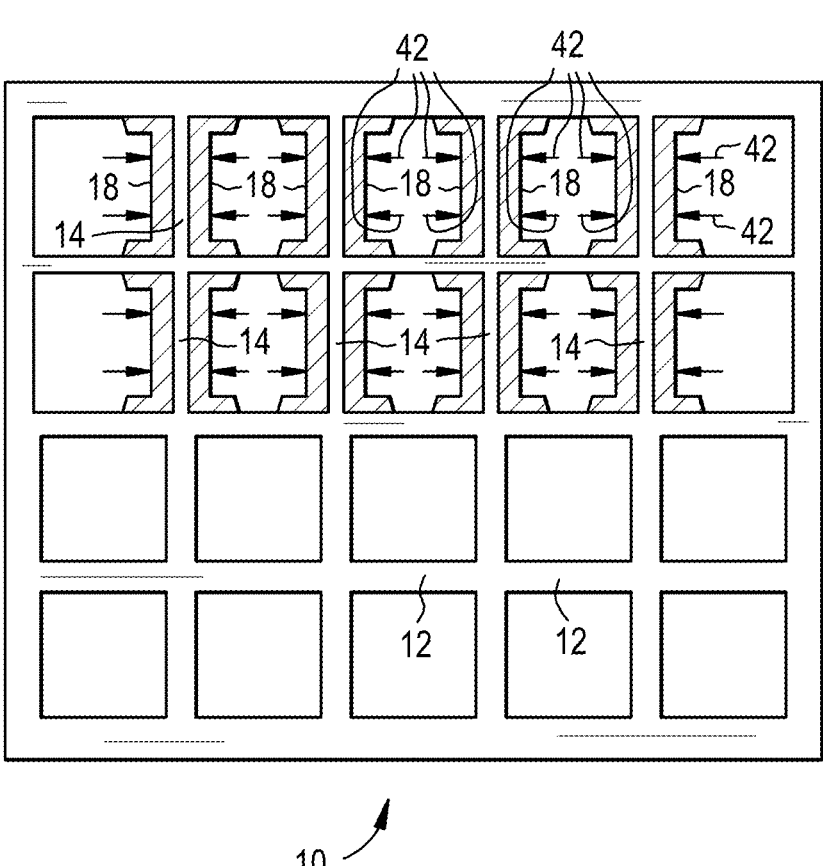

FIGS. 4A and 4B illustrate embodiments of the present invention, wherein anti-crippling stiffeners 18 are attached to integrated thin ribs 14 of a panel 10 in order to effectively make them stiffer and able to be formed without damaging them (i.e., without crippling).

Figure 5:
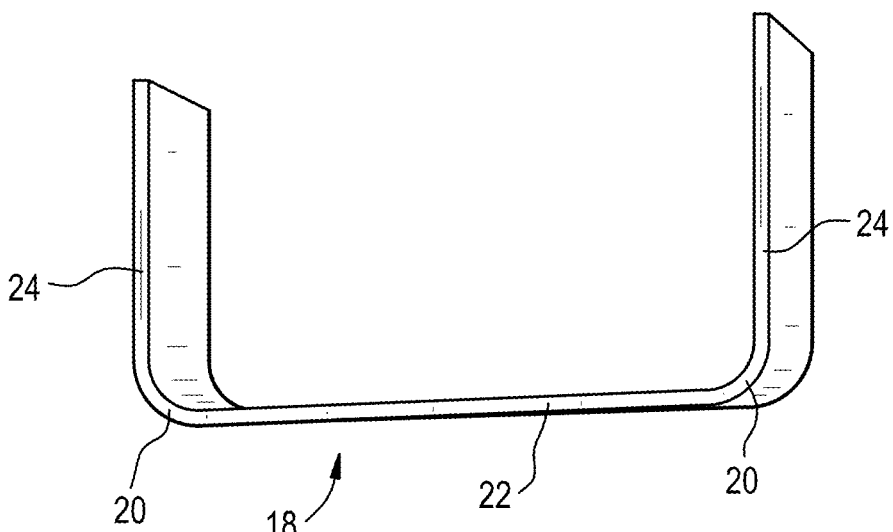
FIG. 5 illustrates one version of anti-crippling stiffener that could be used in association with an embodiment of the present invention, in the form of a C-shaped structure.

FIG. 5 illustrates one version of anti-crippling stiffener 18 that could be used, in the form of a C-shaped structure being formed of a single piece with two bends 20. As such, the stiffener 18 has a beam 22 from which extends two projections 24—one at each bend 20.

Preferably, the anti-crippling stiffener 18 is formed as the same material as the panel 10 itself. For example, both can be formed of aluminum. Alternatively, the anti-crippling stiffener 18 could be formed of a material that is generally stronger than the material of the panel 10. For example, the anti-crippling stiffener 18 could be formed of steel and the panel 10 could be formed of aluminum.

Figure 6:
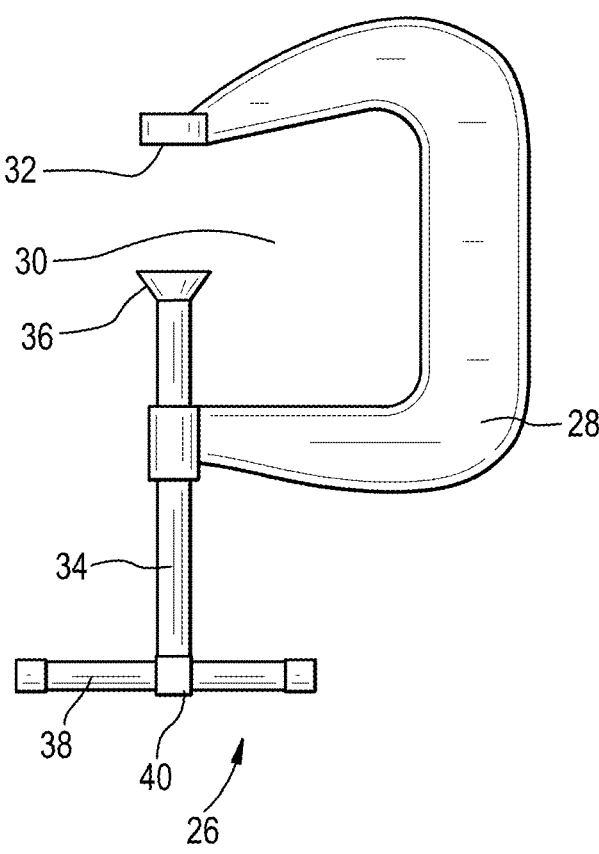
FIG. 6 illustrates a conventional C-shaped clamp that can be used in association with an embodiment of the present invention.

Regardless, preferably the anti-crippling stiffener 18 is attached to one or more integrated ribs 14 of the panel, as shown in FIGS. 4A and 4B, before the panel 10 is formed. This attachment can be affected using one or more clamps, such as the C-shaped clamp 26 shown in FIG. 6. As shown in FIG. 6, the clamp 26 may comprise a frame 28 having a throat 30, wherein the frame 28 provides a fixed jaw 32. A screw 34 is in threaded engagement with the frame 28 and a jaw 36 is provided at the end of the screw 34. The screw 34 can be rotated using a handle 38 that is attached to the screw 34 via a collar 40. As such, the jaw 36 on at the end of the screw 34 is moveable toward and away from the fixed jaw 32 on the frame 28 by rotating the handle 38. The jaw 36 can be moved toward the fixed jaw 32 to ultimately provide the clamping function required to clamp the anti-crippling stiffener 18 (See FIG. 5) to the panel 10 (see FIGS. 4A and 4B).

Figure 7:
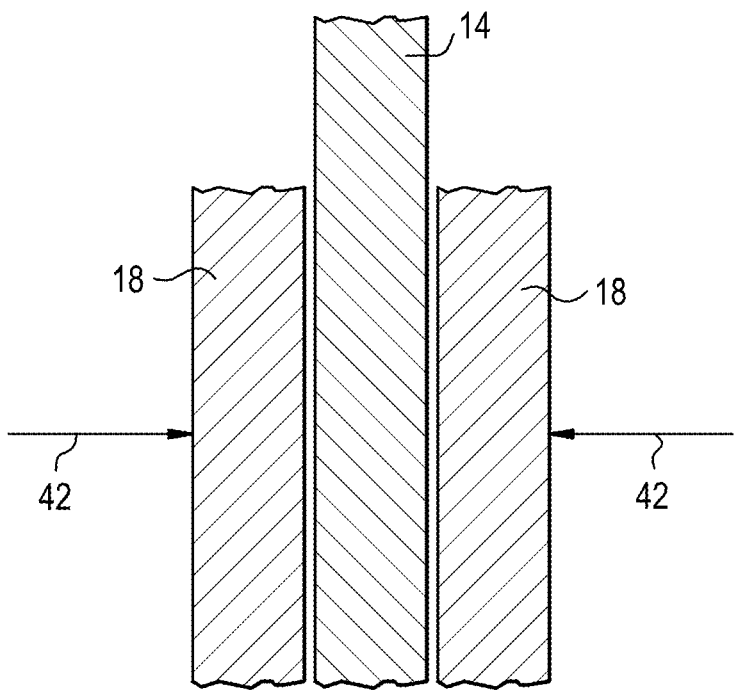
FIG. 7 is a cross-sectional view which illustrates the situation where a clamp contacts two stiffeners and sandwiches a rib between the two stiffeners.
Figure 8:
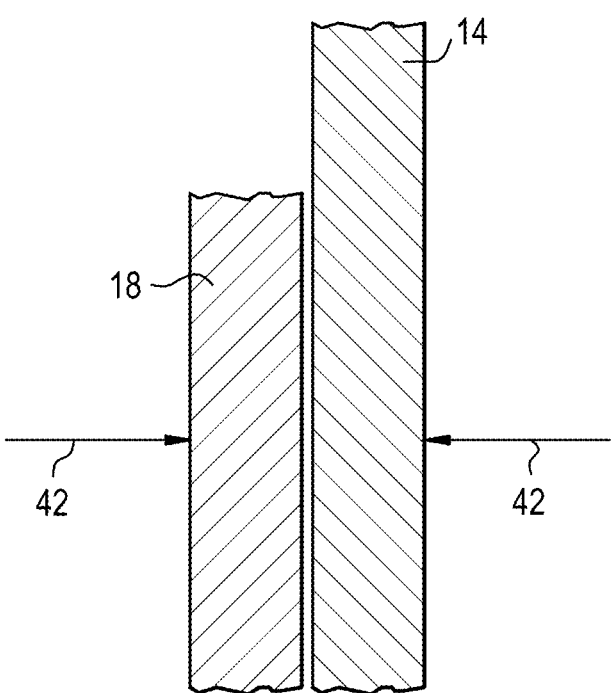
FIG. 8 is a cross-sectional view which illustrates the situation where a clamp contacts both a rib and a stiffener and clamps the stiffener directly to the rib.

The clamps can be used to contact only the stiffeners, as shown in the cross-sectional view illustrated in FIG. 7, wherein a rib 14 is sandwiched between two stiffeners 18. Alternatively, the clamps can be used to contact both a rib 14 and a stiffener 18, as shown in the cross-sectional view illustrated in FIG. 8, such that the stiffener 18 is clamped directly to the rib 14. The points of contact of the clamp 26 (i.e., by the jaws 32 and 36 shown in FIG. 6) are represented by arrows 42 in FIGS. 4A, 4B, 7 and 8. Either one of these methods can be used to increase the stiffness of the ribs 14 of a panel 10. Alternatively, both of these methods can be used on the same panel 10 to provide rib stiffening. Regardless, once the panel has been formed, the clamps can be removed, leaving the stiffeners effectively clamped in place by the ribs themselves. Alternatively, the clamps could be removed during the forming process, such as once the panel starts bending.

In one specific embodiment, the stiffeners are provided as aluminum strips that are brake press formed in a "C" shape to fit inside the rectangular pockets of an orthogrid or rectangular stiffened panel (see FIG. 1A) and locally stiffen thin stiffeners to equalize the stiffness imbalance in the panel caused by design optimization. The "C" shape of the stiffeners makes them lock into the rectangular pockets during forming, so they do not pop out (i.e., disengage) and otherwise require clamps to hold them in place after forming. Assuming it is an aluminum panel being formed, preferably aluminum is used for the stiffeners because it has the same CTE (coefficient of thermal expansion) as the aluminum panel. Of course, other materials could be used and other stiffener shapes besides "C-shaped" are entirely possible while staying fully within scope of the present invention.

The technique can be applied to any of the conventional room temperature forming processes like rolling, brake press forming, and multi-point bending, as well as elevated temperature processes, like age forming.

Regardless of which forming technique is ultimately used, the method of preparing the panel would be the same. In all cases, anti-crippling stiffeners are attached to one of more ribs of the panel before the panel is formed. The anti-crippling stiffeners prevent crippling of the ribs during forming. Preferably, forming of the panel causes the anti-crippling stiffeners to lock in place relative to the panel such that, after the panel is formed, the clamps can be removed and the anti-crippling stiffeners remain in place on the panel due to the engagement with the ribs that result during the forming process. Alternatively, the clamps could be removed during the forming process, such as once the panel starts bending.

Figure 9:
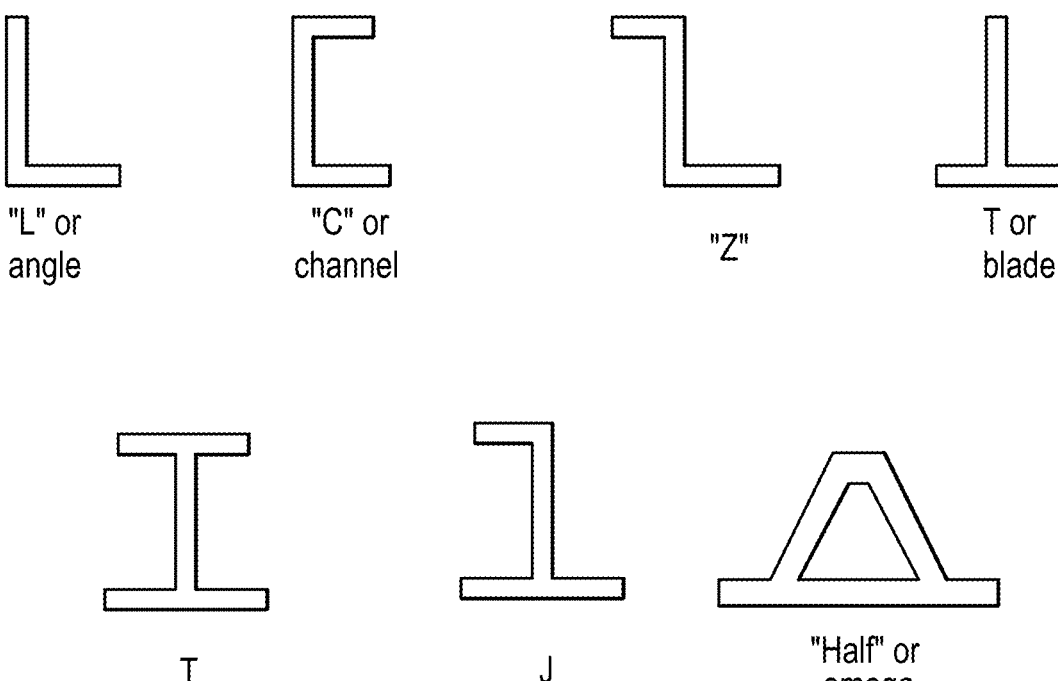
FIG. 9 illustrates that stringers come in a variety of shapes and have changing profiles for strength and weight optimization.

Another embodiment of the present invention relates to wing stringers. Stringers are stiffening elements attached or machined into a wing skin to give it spanwise strength. The stringers must be formed to match the shape of the wing skin. As shown in FIG. 9, stringers come in a variety of shapes and have changing profiles for strength and weight optimization.

Figure 10:
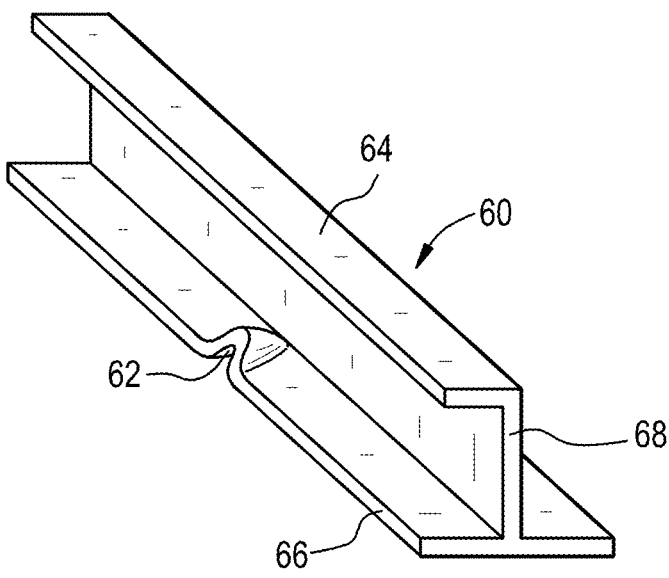
FIG. 10 shows the specific example of a J-shaped stringer having crippling damage that resulting during forming of the stringer.

Thin areas of stringers are often damaged during forming. FIG. 10 shows the specific example of a J-shaped stringer 60 having crippling damage 62. The stringer 60 includes a free flange 64 that is connected to an attachment flange 66 via a web 68. As shown, the attachment flange 66 has suffered crippling 62 during forming of the stringer 60.

Figure 11:
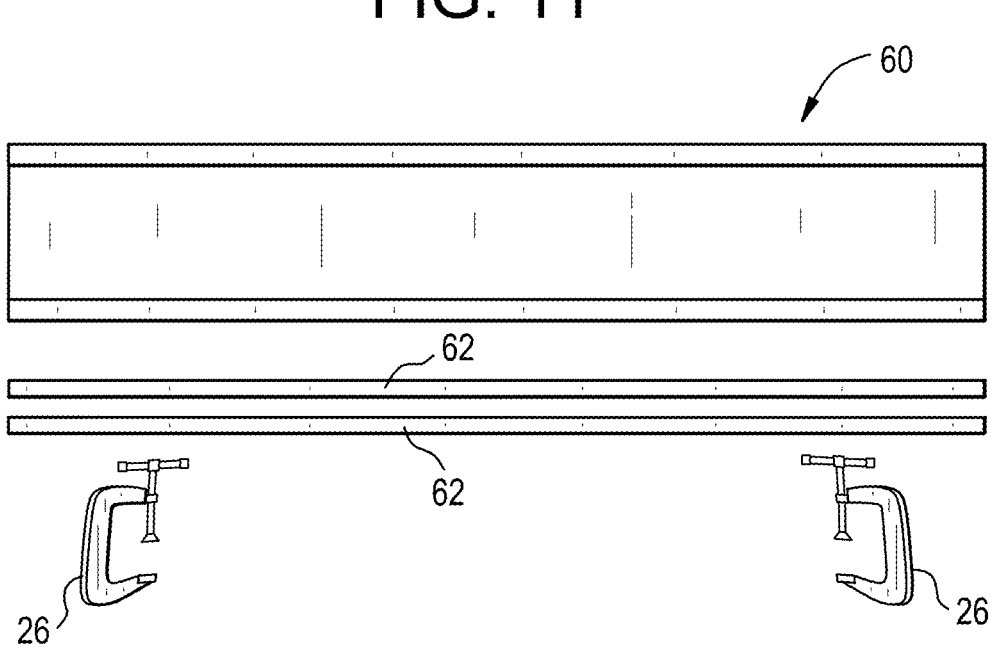
FIG. 11 illustrates a stringer, two anti-crippling straps and two clamps.

FIG. 11 illustrates a stringer 60, two anti-crippling straps 62 and two clamps 26. The two anti-crippling straps 62 could comprise steel or aluminum straps and the clamps 26 could be consistent with what is shown in FIG. 6 and described previously.

Figure 12:
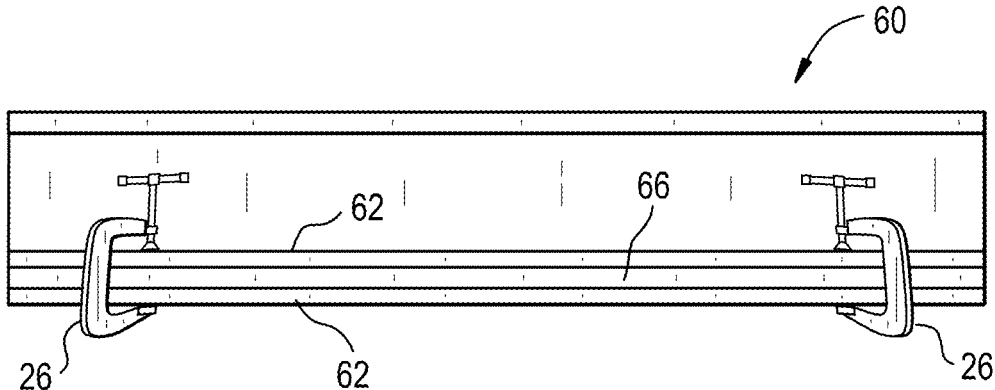
FIG. 12 illustrates the anti-crippling straps clamped to the stringer, one on each side of a flange of the stringer, in accordance with an embodiment of the present invention.
Figure 13:
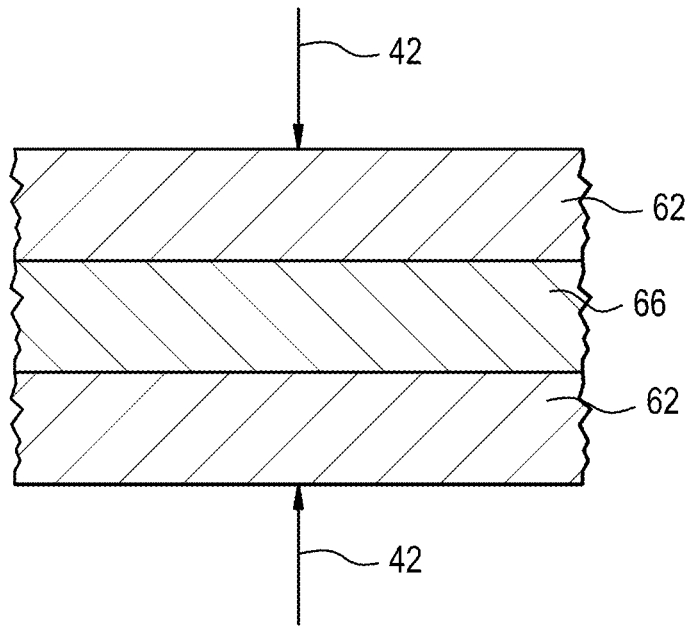
FIG. 13 provides a cross-sectional view showing the flange clamped between the two anti-crippling straps.

In use, as shown in FIG. 12, the anti-crippling straps 62 are clamped to the stringer 60, for example one on each side of the flange 66 of the stringer 60 to stabilize and strengthen the flange 66 during forming of the stringer 60. The wing stringer 60 could, for example, be formed using the machines disclosed in either U.S. Pat. No. 10,052,670 or 11,014,135. After forming the wing stringer 60, the clamps 26 and anti-crippling straps 62 are removed from flange 66 of the wing stringer 60. FIG. 13 provides a cross-sectional view showing the flange 66 clamped between the two anti-crippling straps 62 with points of contact of the clamps 26 being identified with arrows 42.

The anti-crippling straps 62 shown in FIGS. 12 and 13 could likewise be attached to flange 64 (see FIG. 10). Preferably, the anti-crippling straps 62 are used on the weaker flange or the flange that is being put into compression during the forming operation, if crippling is a concern. If crippling is not a concern, the straps 62 need not be used. Preferably, one considers the specific bending situation (i.e., the amount of bending and compression) and the cross-sectional moment of inertia of the stiffener to determine when crippling is likely and that determines whether anti-crippling straps 62 are used or not.

Furthermore, while the use of two anti-crippling straps 62 is shown in FIGS. 11, 12 and 13, it is possible to use a single strap to stiffen a rib or flange (such as the flange 64 shown in FIG. 10) and prevent crippling. That being said, double straps (one on each side of the flange 66 are used as shown in FIGS. 12 and 13 to protect the surface of the flange 66 from damage from the clamp 26 or the forming machine.

Figure 14:
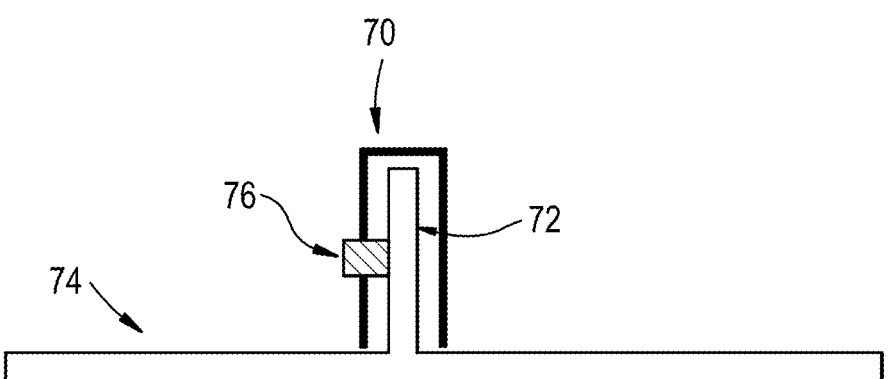
FIG. 14 illustrates an anti-crippling strap providing a cap over a rib and the strap being held in place using a set screw.

There are a multitude of ways to attach anti-crippling straps to ribs or flanges. The use of a C-shaped clamp 26 is shown and described herein merely because such clamps are easy to apply and remove. However, some forming methods, like roll forming, will not permit the use of C-shaped clamps because the clamps will not pass through the rolls. For these types of applications, it is possible (as shown in FIG. 14) to make single piece straps 70 that fit over a rib 72 on a panel 74 like a cap and are held in place with a set screw 76 or some spring-loaded device. The stiffening principle is the same as was described hereinabove (i.e., with regard to FIGS. 4A, 4B and 12) but the mechanism for holding the straps 70 in place is slightly different to allow for clearance through the bending apparatus; regardless, it is still a form of mechanical clamping.

Figure 15:
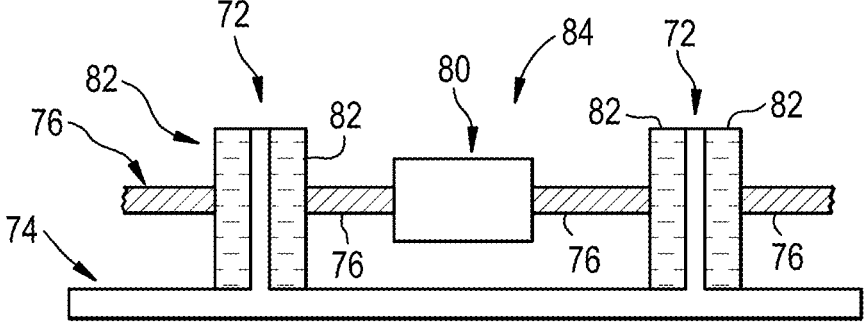
FIG. 15 shows a turn buckle being used to clamp straps in place from the inside of a pocket, so that nothing sticks above the ribs that would interfere with, for example, a roll forming machine or brake press.

FIG. 15 is similar to FIG. 14 and uses similar part numbers to identify similar parts. However, FIG. 15 specifically shows a way to use turn buckles 80 to clamp straps 82 in place from the inside of the pocket 84, so that nothing sticks above the ribs 72 that would interfere with, for example, a roll forming machine or brake press.

Regardless of which embodiment is practiced, the idea is to employ anti-crippling members to prevent crippling of a portion of a part during forming of the part, such as to prevent crippling of the ribs of a panel or to prevent crippling of a flange of a wing stringer.

While the anti-buckling stiffeners have been described and shown as being either flat or bent strips of, for example, aluminum or steel, they could also take other shapes such as angles, channels, or other cross sections and be formed of other materials while still staying fully within the scope of the present invention.

Furthermore, while mechanical attachment using C-shaped clamps has been described and shown, the anti-crippling stiffeners could be attached with, for example, sacrificial fasteners instead such as a plastic fastener that is configured to quick release. Another embodiment could provide that the anti-crippling stiffeners are temporarily adhesive bonded to the ribs or flanges. In that case, the adhesive could be, for example, a UV cured spray on adhesive, an adhesive that dissolves under the presence of temperature and releases the stiffener, etc. In yet another embodiment, the anti-crippling stiffeners could be magnetically attached to the ribs or flanges. Regardless of the method of attachment, and regardless of the exact shape or material of the stiffeners, the goal is to provide an added stiffener before the forming process in order to prevent crippling during forming.

While specific embodiments of the invention have been shown and described, it is envisioned that those skilled in the art may devise various modifications without departing from the spirit and scope of the present invention.

What is claimed is:

1. A method of stiffening a rib of a panel to prevent crippling of the rib during forming of the panel, said method comprising:
   attaching an anti-crippling stiffener to the rib;

forming the panel while the anti-crippling stiffener is attached to the rib, wherein the anti-crippling stiffener is C-shaped.

2. A method as recited in claim 1, further comprising using a clamp to attach the anti-crippling stiffener to the rib.

3. A method as recited in claim 2, further comprising removing the clamp from the anti-crippling stiffener after forming the panel.

4. A method as recited in claim 1, further comprising using a C-shaped clamp to attach the anti-crippling stiffener to the rib.

5. A method as recited in claim 1, wherein both the anti-crippling stiffener and the panel are formed of aluminum.

6. A method as recited in claim 1, further comprising using a set screw to attach the anti-crippling stiffener to the rib.

7. A method as recited in claim 1, wherein the anti-crippling stiffener provides a cap over the rib.

8. A method as recited in claim 1, further comprising using a set screw and a turn buckle to attach the anti-crippling stiffener to the rib.

9. A method as recited in claim 1, wherein the step of attaching an anti-crippling stiffener to the rib comprises sandwiching the rib between two anti-crippling stiffeners.

10. A method as recited in claim 1, wherein the step of attaching an anti-crippling stiffener to the rib comprises clamping the anti-crippling stiffener directly to the rib.

11. A method as recited in claim 1, further comprising using a clamp to attach the anti-crippling stiffener to the rib, wherein the step of attaching an anti-crippling stiffener to the rib comprises having the clamp contact two anti-crippling stiffeners to sandwich the rib between the two anti-crippling stiffeners.

12. A method as recited in claim 1, further comprising using a clamp to attach the anti-crippling stiffener to the rib, wherein the step of attaching an anti-crippling stiffener to the rib comprises having the clamp contact the rib and the anti-crippling stiffener such that the anti-crippling stiffener is clamped directly to the rib.

13. A method as recited in claim 1, further comprising locking the anti-crippling stiffener to the rib during forming of the panel.

14. A method as recited in claim 1, further comprising using a clamp to attach the anti-crippling stiffener to the rib, further comprising locking the anti-crippling stiffener to the rib during forming of the panel and, after forming the panel, removing the clamp from the anti-crippling stiffener.

15. A method of stiffening a flange of a wing stringer to prevent crippling of the flange during forming of the wing stringer, said method comprising:
   attaching an anti-crippling strap to one side of the flange of the wing stringer; and
   forming the wing stringer while the anti-crippling strap is attached to the flange, further comprising attaching a second anti-crippling strap to another side of the flange of the wing stringer.

16. A method as recited in claim 15, further comprising using a clamp to attach the anti-crippling strap to the flange.

17. A method as recited in claim 16, further comprising removing the clamp from the anti-crippling strap after forming the wing stringer.

18. A method as recited in claim 15, further comprising using a C-shaped clamp to attach the anti-crippling strap to the flange of the wing stringer.

19. A method of stiffening a rib of a panel to prevent crippling of the rib during forming of the panel, said method comprising:

attaching an anti-crippling stiffener to the rib;

forming the panel while the anti-crippling stiffener is attached to the rib, wherein the anti-crippling stiffener provides a cap over the rib.

20. A method as recited in claim 19, further comprising using a clamp to attach the anti-crippling stiffener to the rib.

21. A method as recited in claim 20, further comprising removing the clamp from the anti-crippling stiffener after forming the panel.

22. A method as recited in claim 19, further comprising using a C-shaped clamp to attach the anti-crippling stiffener to the rib.

23. A method as recited in claim 19, wherein the anti-crippling stiffener is C-shaped.

24. A method as recited in claim 19, wherein both the anti-crippling stiffener and the panel are formed of aluminum.

25. A method as recited in claim 19, further comprising using a set screw to attach the anti-crippling stiffener to the rib.

26. A method as recited in claim 19, further comprising using a set screw and a turn buckle to attach the anti-crippling stiffener to the rib.

27. A method as recited in claim 19, wherein the step of attaching an anti-crippling stiffener to the rib comprises sandwiching the rib between two anti-crippling stiffeners.

28. A method as recited in claim 19, wherein the step of attaching an anti-crippling stiffener to the rib comprises clamping the anti-crippling stiffener directly to the rib.

29. A method as recited in claim 19, further comprising using a clamp to attach the anti-crippling stiffener to the rib, wherein the step of attaching an anti-crippling stiffener to the rib comprises having the clamp contact two anti-crippling stiffeners to sandwich the rib between the two anti-crippling stiffeners.

30. A method as recited in claim 19, further comprising using a clamp to attach the anti-crippling stiffener to the rib, wherein the step of attaching an anti-crippling stiffener to the rib comprises having the clamp contact the rib and the anti-crippling stiffener such that the anti-crippling stiffener is clamped directly to the rib.

31. A method as recited in claim 19, further comprising locking the anti-crippling stiffener to the rib during forming of the panel.

32. A method as recited in claim 19, further comprising using a clamp to attach the anti-crippling stiffener to the rib, further comprising locking the anti-crippling stiffener to the rib during forming of the panel and, after forming the panel, removing the clamp from the anti-crippling stiffener.

33. A method of stiffening a rib of a panel to prevent crippling of the rib during forming of the panel, said method comprising:

attaching an anti-crippling stiffener to the rib;

forming the panel while the anti-crippling stiffener is attached to the rib, further comprising using a set screw and a turn buckle to attach the anti-crippling stiffener to the rib.

34. A method as recited in claim 33, further comprising using a clamp to attach the anti-crippling stiffener to the rib.

35. A method as recited in claim 34, further comprising removing the clamp from the anti-crippling stiffener after forming the panel.

36. A method as recited in claim 33, further comprising using a C-shaped clamp to attach the anti-crippling stiffener to the rib.

37. A method as recited in claim 33, wherein the anti-crippling stiffener is C-shaped.

38. A method as recited in claim 33, wherein both the anti-crippling stiffener and the panel are formed of aluminum.

39. A method as recited in claim 33, wherein the anti-crippling stiffener provides a cap over the rib.

40. A method as recited in claim 33, wherein the step of attaching an anti-crippling stiffener to the rib comprises sandwiching the rib between two anti-crippling stiffeners.

41. A method as recited in claim 33, wherein the step of attaching an anti-crippling stiffener to the rib comprises clamping the anti-crippling stiffener directly to the rib.

42. A method as recited in claim 33, further comprising using a clamp to attach the anti-crippling stiffener to the rib, wherein the step of attaching an anti-crippling stiffener to the rib comprises having the clamp contact two anti-crippling stiffeners to sandwich the rib between the two anti-crippling stiffeners.

43. A method as recited in claim 33, further comprising using a clamp to attach the anti-crippling stiffener to the rib, wherein the step of attaching an anti-crippling stiffener to the rib comprises having the clamp contact the rib and the anti-crippling stiffener such that the anti-crippling stiffener is clamped directly to the rib.

44. A method as recited in claim 33, further comprising locking the anti-crippling stiffener to the rib during forming of the panel.

45. A method as recited in claim 33, further comprising using a clamp to attach the anti-crippling stiffener to the rib, further comprising locking the anti-crippling stiffener to the rib during forming of the panel and, after forming the panel, removing the clamp from the anti-crippling stiffener.

46. A method of stiffening a rib of a panel to prevent crippling of the rib during forming of the panel, said method comprising:

attaching an anti-crippling stiffener to the rib;

forming the panel while the anti-crippling stiffener is attached to the rib, further comprising using a clamp to attach the anti-crippling stiffener to the rib, wherein the step of attaching an anti-crippling stiffener to the rib comprises having the clamp contact two anti-crippling stiffeners to sandwich the rib between the two anti-crippling stiffeners.

47. A method as recited in claim 46, further comprising removing the clamp from the anti-crippling stiffener after forming the panel.

48. A method as recited in claim 47, further comprising using a C-shaped clamp to attach the anti-crippling stiffener to the rib.

49. A method as recited in claim 46, wherein the anti-crippling stiffener is C-shaped.

50. A method as recited in claim 46, wherein both the anti-crippling stiffener and the panel are formed of aluminum.

51. A method as recited in claim 46, further comprising using a set screw to attach the anti-crippling stiffener to the rib.

52. A method as recited in claim 46, wherein the anti-crippling stiffener provides a cap over the rib.

53. A method as recited in claim 46, further comprising using a set screw and a turn buckle to attach the anti-crippling stiffener to the rib.

54. A method as recited in claim 46, wherein the step of attaching an anti-crippling stiffener to the rib comprises sandwiching the rib between two anti-crippling stiffeners.

55. A method as recited in claim 46, wherein the step of attaching an anti-crippling stiffener to the rib comprises clamping the anti-crippling stiffener directly to the rib.

56. A method as recited in claim 46, further comprising using a clamp to attach the anti-crippling stiffener to the rib, wherein the step of attaching an anti-crippling stiffener to the rib comprises having the clamp contact the rib and the anti-crippling stiffener such that the anti-crippling stiffener is clamped directly to the rib.

57. A method as recited in claim 46, further comprising locking the anti-crippling stiffener to the rib during forming of the panel.

58. A method as recited in claim 46, further comprising using a clamp to attach the anti-crippling stiffener to the rib, further comprising locking the anti-crippling stiffener to the rib during forming of the panel and, after forming the panel, removing the clamp from the anti-crippling stiffener.

* * * * *